United States Patent
Huang

(10) Patent No.: US 8,868,012 B2
(45) Date of Patent: Oct. 21, 2014

(54) FREQUENCY-MULTIPLIED HARMONIC SUPRESSION METHOD FOR RF CIRCUIT

(71) Applicant: Shun-Fu Technology Corp., Taipei (TW)

(72) Inventor: Yung-Sheng Huang, Taipei (TW)

(73) Assignee: Shun-Fu Technology Corp., Taipei (TW)

( * ) Notice: Subject to any disclaimer, the term of this patent is extended or adjusted under 35 U.S.C. 154(b) by 0 days.

(21) Appl. No.: 13/959,089

(22) Filed: Aug. 5, 2013

(65) Prior Publication Data

US 2014/0065988 A1    Mar. 6, 2014

(30) Foreign Application Priority Data

Aug. 31, 2012    (TW) .............................. 101131728 A

(51) Int. Cl.
*H04B 1/04*    (2006.01)

(52) U.S. Cl.
CPC .................................. *H04B 1/0475* (2013.01)
USPC ..... 455/114.1; 455/112; 455/113; 455/114.3; 455/306

(58) Field of Classification Search
CPC ........... H04B 1/0475; H04B 1/10; H04B 1/04
USPC ............ 455/112, 113, 114.1, 114.3, 306, 307
See application file for complete search history.

(56) References Cited

U.S. PATENT DOCUMENTS

| 7,550,977 B2 * | 6/2009 | Quan ............................ 324/622 |
| 2008/0007369 A1 * | 1/2008 | Barber et al. ................. 333/189 |
| 2010/0073107 A1 * | 3/2010 | Prophet et al. ................ 333/204 |

* cited by examiner

*Primary Examiner* — Tuan Pham
(74) *Attorney, Agent, or Firm* — Guice Patents PLLC

(57) ABSTRACT

A frequency-multiplied harmonic suppression RF circuit design method includes the steps of defining respective operating frequencies of predetermined major electronic components of the RF circuit to be designed, using these operating frequencies to calculate the values of respective frequency-multiplied harmonics and intermodulation distorsions, designing respective filters subject to the values of the frequency-multiplied harmonics and intermodulation distorsions obtained, calculating the locations of the frequency-multiplied harmonics in the RF circuit under design, installing the designed filters in the calculated locations, and testing and adjusting the installed filters.

4 Claims, 3 Drawing Sheets

FREQUENCY-MULTIPLIED HARMONIC SUPRESSION METHOD FOR RF CIRCUIT

BACKGROUND OF THE INVENTION

1. Field of the Invention

The present invention relates to radio frequency technology, and more particularly to a frequency-multiplied harmonic suppression method for a RF circuit to suppress frequency-multiplied harmonics.

2. Description of the Related Art

With the application of wireless communication systems in different fields, the communication distance and speed of wireless communication systems have been greatly enhanced. Under this condition, the RF power of the transmitter of the RF communication system must be increased. However, due to nonlinear characteristics of the related semiconductor components and the circuit, increasing the RF power of the transmitter can cause generation of odd order and even order frequency-multiplied harmonics at the output end of the circuit, and the generated frequency-multiplied harmonics will be directly radiated into the air to directly interfere with other communication equipments.

To eliminate the interference of frequency-multiplied harmonics, the most commonly used conventional method is the use of a tin plate to directly isolate the circuit. Under normal application, the use of a tin plate can impart an optimal effect to suppress frequency-multiplied harmonics within the safety range and to reduce their interference with other communication equipments only when the output power is under 14~16 dBm. If the output power of the RF amplifier circuit surpasses the aforesaid range, an insufficient thickness tin plate will not be able to prevent leakage of the frequency-multiplied harmonics, leaving the original problem unsolved.

For suppressing frequency-multiplied harmonics generated during operation of a RF amplifier circuit of output power in or over the range of 27~30 dBm, an aluminum die-casting housing having a relatively larger wall thickness and stronger anti-penetration power may be used instead of a tin plate. An aluminum die-casting housing of wall thickness in or over the range of 5~10 mm can effectively prevent leakage of frequency-multiplied harmonics. However, the use of a thick metal housing increases the weight, material cost, molding cost as well as delivery cost. This solution is not blessed.

SUMMARY OF THE INVENTION

The present invention has been accomplished under the circumstances in view. It is main object of the present invention to provide a frequency-multiplied harmonic suppression method for a RF circuit to suppress frequency-multiplied harmonics by analyzing the locations and values of possible frequency-multiplied harmonics and then utilizing corresponding filters for suppressing the possible frequency-multiplied harmonics to reduce their values.

To achieve this and other objects of the present invention, a frequency-multiplied harmonic suppression method for a RF circuit includes the step of defining respective operating frequencies of predetermined major electronic components of the RF circuit to be designed, the step of using these operating frequencies to calculate the values of respective frequency-multiplied harmonics and intermodulation distorsions, the step of designing respective filters subject to the values of the frequency-multiplied harmonics and intermodulation distorsions obtained, the step of calculating the locations of the frequency-multiplied harmonics in the RF circuit under design, the step of installing the designed filters in the calculated locations, and then the step of testing and adjusting the installed filters to make sure that the circuit under design is within the safety range.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
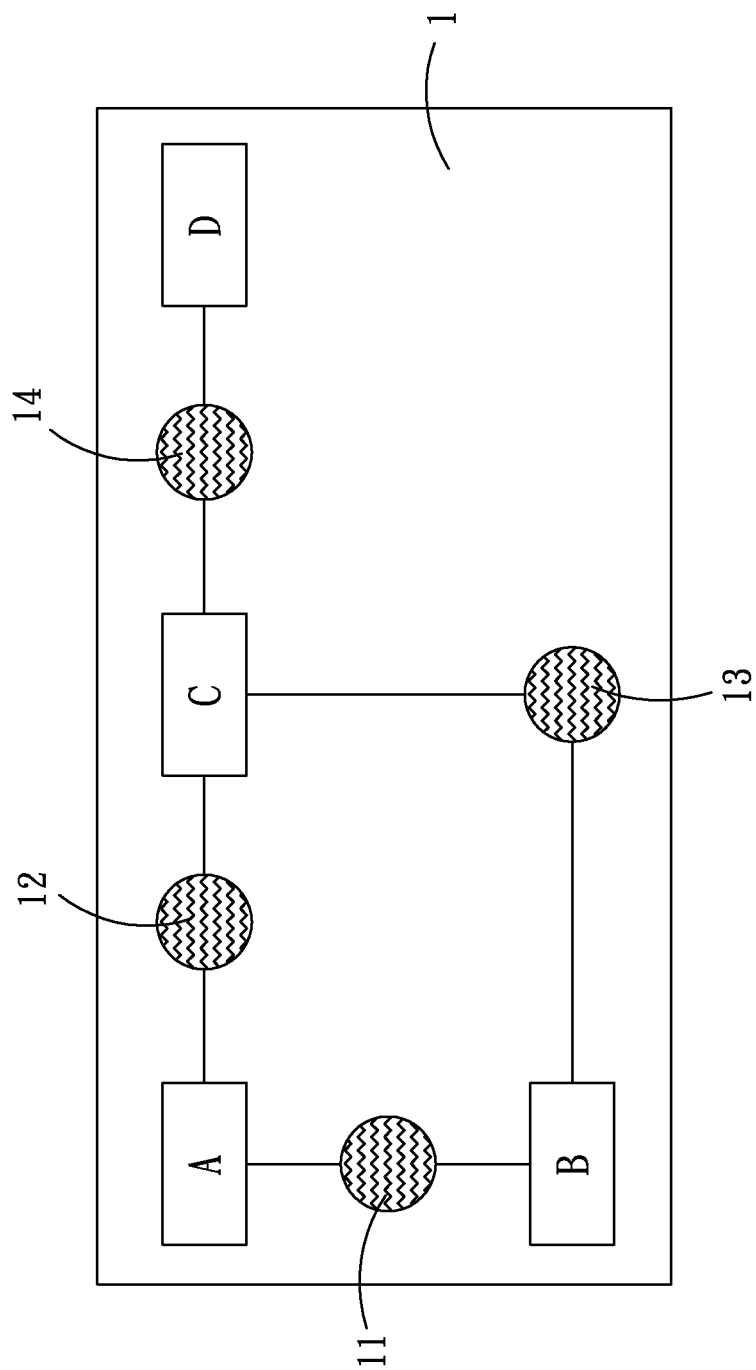
FIG. 1 is a circuit block diagram of a RF circuit designed in accordance with the present invention.

Referring to FIG. 1, a designed circuit 1 in accordance with the present invention is shown. The design circuit 1 comprises a plurality of electronic components A, B, C and D, wherein component A is respectively electrically connected to component B and component C; component C is respectively electrically connected to component B and component D. The operating frequencies of these electronic components A, B, C and D are $f_a$, $f_b$, $f_c$ and $f_d$ respectively. Because every frequency-multiplied harmonic generated in the designed circuit 1 is n times the respective operating frequency, the frequency-multiplied harmonics generated during operation of these electronic components A, B, C and D are $Nf_a$, $Nf_b$, $Nf_c$ and $Nf_d$ respectively, and the respective intermodulation distorsions are $f_a-f_b$, $f_b-f_a$, $f_c-f_b$ and $f_d-f_c$ respectively. Thereafter, install filters 11~14 among these electronic components A, B, C and D at locations where frequency-multiplied harmonics can be generated to suppress the generated frequency-multiplied harmonics $Nf_a$, $Nf_b$, $Nf_c$ and $Nf_d$ and the generated intermodulation distorsions $f_a-f_b$, $f_b-f_a$, $f_c-f_b$ and $f_d-f_c$. These filters 11~14 are selected from the group of low-pass filters, high-pass filters, band-pass filters and band-stop (band-rejection) filters. The filtering orders of these filters 11~14 can be 1, 2, 3, . . . or N. After installation of these filters 11~14, they are tested, and then fine-adjusted subject to the respective test data to match with the tin plate that surrounds the designed circuit 1. Through the double action of suppression and prevention, the invention effectively reduces the effects of the frequency-multiplied harmonics.

Figure 2:
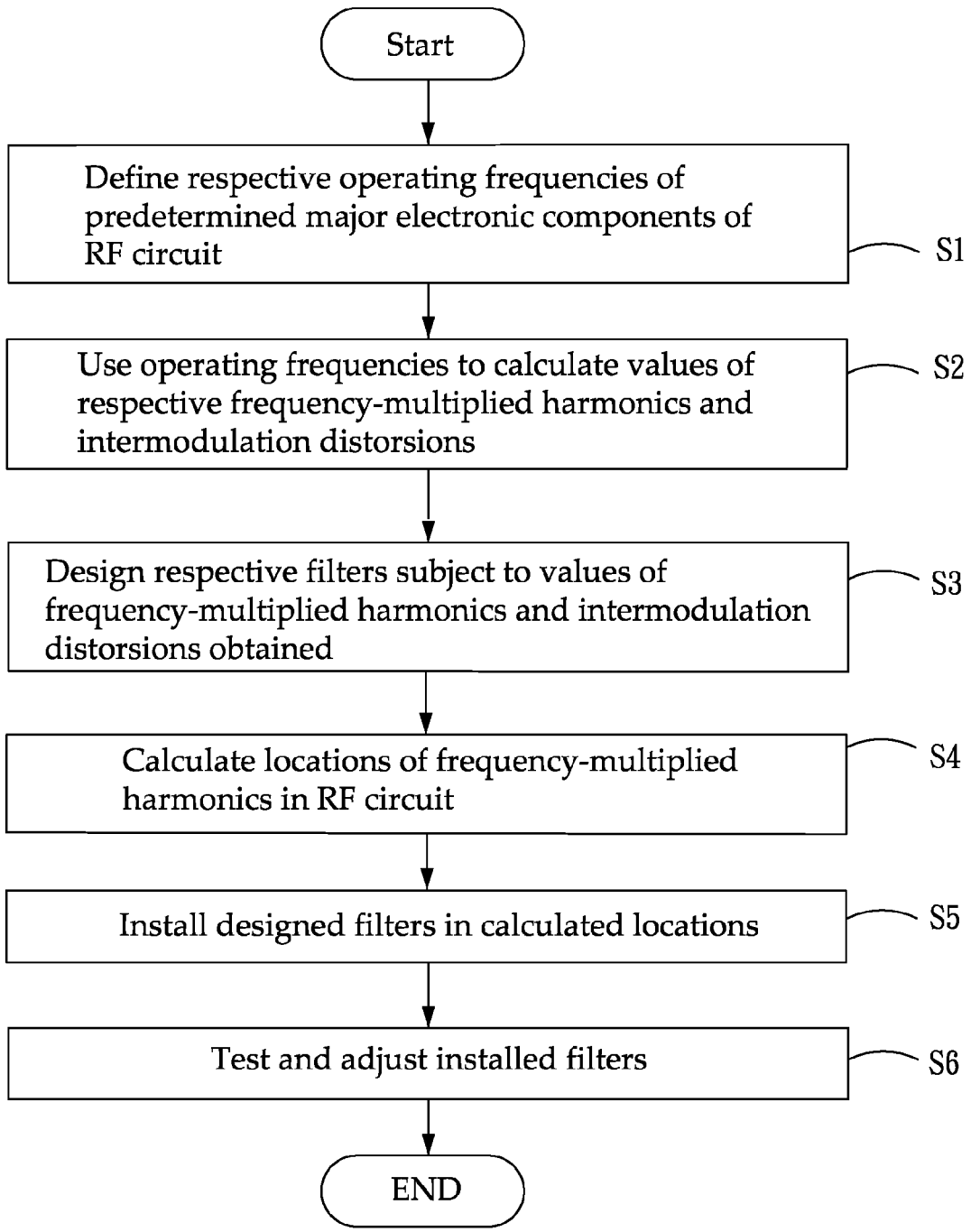
FIG. 2 is flow chart of a frequency-multiplied harmonic suppression method in accordance with the present invention.

Referring to FIG. 2, a frequency-multiplied harmonic suppression method for a RF circuit in accordance with the present invention includes the steps of:

(S1) defining respective operating frequencies of predetermined major electronic components of the RF circuit to be designed;

(S2) using these operating frequencies to calculate the values of respective frequency-multiplied harmonics and intermodulation distorsions;

(S3) designing respective filters subject to the values of the frequency-multiplied harmonics and intermodulation distorsions obtained;

(S4) calculating the locations of the frequency-multiplied harmonics in the RF circuit under design;

(S5) installing the designed filters in the calculated locations; and (S6) testing and adjusting the installed filters.

Figure 3:
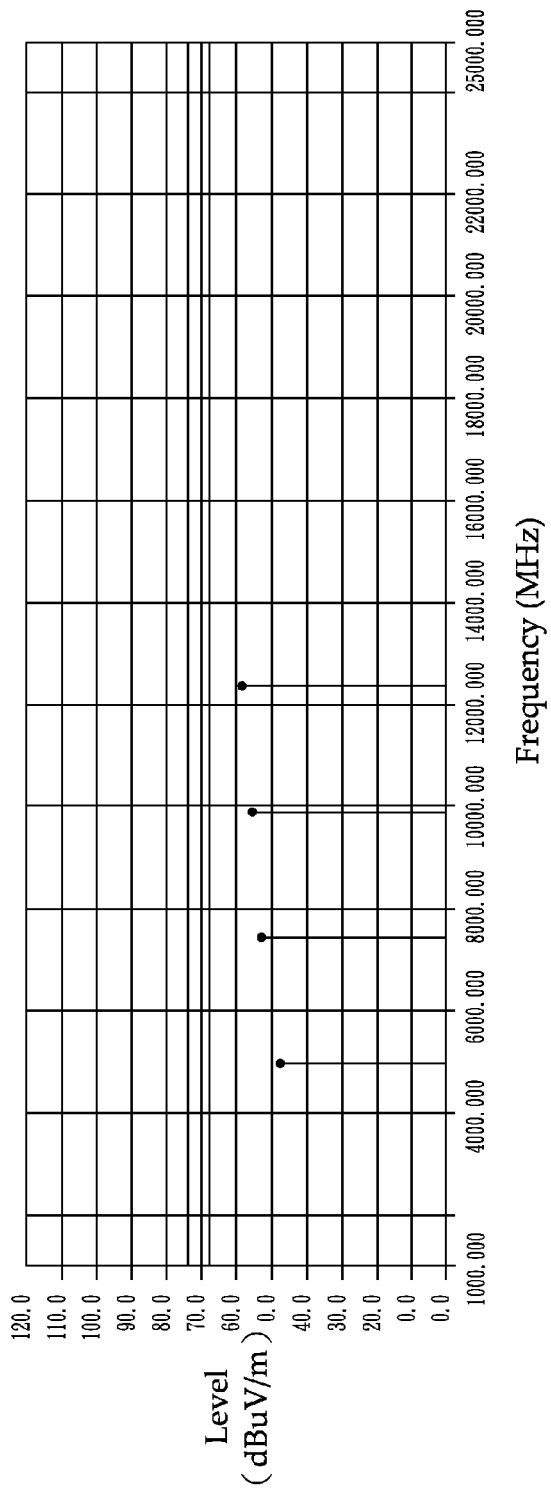
FIG. 3 shows test data charts obtained in accordance with the present invention.

Referring to FIG. 3, test data obtained in accordance with the present invention are shown. In an application example of the present invention, a 2.4 GHz RF-module IC designed in accordance with the present invention is attached with a RF power amplifier to provide an output frequency as high as 27 dBm. After through EMI/EMC testing, the test data meet the regulatory requirements per FCC15,247 ruling.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A frequency-multiplied harmonic suppression method for a RF circuit, comprising the steps of:
    (a) defining respective operating frequencies of predetermined major electronic components of the RF circuit to be designed;
    (b) using the operating frequencies to calculate the values of respective frequency-multiplied harmonics and intermodulation distorsions;
    (c) designing respective filters subject to the values of the frequency-multiplied harmonics and intermodulation distorsions obtained; and
    (d) testing and adjusting the installed filters.

2. The frequency-multiplied harmonic suppression method for a RF circuit as claimed in claim 1, further comprising a sub-step of calculating the locations of the frequency-multiplied harmonics in the RF circuit under design prior to step (c) and after step (d).

3. The frequency-multiplied harmonic suppression method for a RF circuit as claimed in claim 1, further comprising a sub-step of installing the designed filters in predetermined locations in the RF circuit prior to step (d) and after step (c).

4. The frequency-multiplied harmonic suppression method for a RF circuit as claimed in claim 1, wherein said filters are selected from the group of low-pass filters, high-pass filters, band-pass filters and band-stop filters.

* * * * *